US012571390B2

(12) United States Patent
Hoshino et al.

(10) Patent No.: US 12,571,390 B2
(45) Date of Patent: Mar. 10, 2026

(54) PLUNGER PUMP AND LIQUID BLOW MOLDING DEVICE

(71) Applicant: YOSHINO KOGYOSHO CO., LTD., Tokyo (JP)

(72) Inventors: Hideaki Hoshino, Tokyo (JP); Yuichi Okuyama, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 269 days.

(21) Appl. No.: 17/904,708

(22) PCT Filed: Jan. 28, 2021

(86) PCT No.: PCT/JP2021/003079
§ 371 (c)(1),
(2) Date: Aug. 19, 2022

(87) PCT Pub. No.: WO2021/171893
PCT Pub. Date: Sep. 2, 2021

(65) Prior Publication Data
US 2022/0412347 A1 Dec. 29, 2022

(30) Foreign Application Priority Data

Feb. 28, 2020 (JP) ................................. 2020-034367

(51) Int. Cl.
B29C 49/42 (2006.01)
B29C 49/28 (2006.01)
(Continued)

(52) U.S. Cl.
CPC ............ F04B 53/162 (2013.01); B29C 49/42 (2013.01); B29C 49/42403 (2022.05);
(Continued)

(58) Field of Classification Search
CPC ... B29C 49/42403; B29C 49/46; B29C 49/58; B29C 49/28; B29C 2049/4664;
(Continued)

(56) References Cited

U.S. PATENT DOCUMENTS 3,132,568 A * 5/1964 Strader .................... F16J 10/02
92/252
2008/0193299 A1 8/2008 Oglesby
(Continued)

FOREIGN PATENT DOCUMENTS

DE 103 06 476 B3 8/2004
JP H02-023272 A 1/1990
(Continued)

OTHER PUBLICATIONS

English Translation of JP2019074016A (Year: 2019).*
(Continued)

*Primary Examiner* — Galen H Hauth
*Assistant Examiner* — Baileigh Kate Darnell
(74) *Attorney, Agent, or Firm* — Oliff PLC

(57) ABSTRACT

A plunger pump, including: a tubular cylinder that has an internal space communicating with inlet and outlet flow paths; and a piston that is movable along an axis of the cylinder, wherein a head of the piston includes, on an outer peripheral surface thereof, a sealing portion that is slidable against an inner peripheral surface of the cylinder, which includes a body tubular portion wherein the head is arranged during normal use, and a cleaning tubular portion wherein the head is arranged during cleaning, an inner peripheral surface of the cleaning tubular portion has an inner diameter equal to that of an inner peripheral surface of the body tubular portion, the cleaning tubular portion includes, on the inner peripheral surface thereof, at least one cleaning liquid circulation groove that is configured by a through hole or (Continued)

recess, and the cleaning liquid circulation groove extends obliquely with respect to the axis.

20 Claims, 3 Drawing Sheets

(51) Int. Cl.

| | |
|---|---|
| *B29C 49/46* | (2006.01) |
| *B29C 49/58* | (2006.01) |
| *F04B 19/22* | (2006.01) |
| *F04B 53/14* | (2006.01) |
| *F04B 53/16* | (2006.01) |
| *B29K 23/00* | (2006.01) |
| *B29K 67/00* | (2006.01) |
| *B29L 31/00* | (2006.01) |

(52) U.S. Cl.
CPC ........ *B29C 49/42808* (2022.05); *B29C 49/46* (2013.01); *B29C 49/58* (2013.01); *F04B 19/22* (2013.01); *F04B 53/14* (2013.01); *B29C 49/28* (2013.01); *B29C 2049/4664* (2013.01); *B29K 2023/12* (2013.01); *B29K 2067/003* (2013.01); *B29L 2031/7158* (2013.01)

(58) Field of Classification Search
CPC ....... B29C 2049/465; B29C 2949/0715; F04B 53/162; F04B 53/14; F04B 53/008; F04B 53/143; F04B 19/22; F04B 15/02; F04B 15/04

See application file for complete search history.

(56) References Cited

U.S. PATENT DOCUMENTS

| | | | | |
|---|---|---|---|---|
| 2010/0196178 A1* | 8/2010 | Sjogren | ................. | F04B 53/148 |
| | | | | 417/415 |
| 2018/0319070 A1* | 11/2018 | Okuyama | ........... | B29C 49/4289 |
| 2022/0099074 A1* | 3/2022 | Yamabe | ................. | F04B 53/16 |

FOREIGN PATENT DOCUMENTS

| | | | |
|---|---|---|---|
| JP | 2007-287831 | A | 11/2007 |
| JP | 2008-164301 | A | 7/2008 |
| JP | 2011-012591 | A | 1/2011 |
| JP | 2017-501940 | A | 1/2017 |
| KR | 10-2008-0020452 | A | 3/2008 |

OTHER PUBLICATIONS

Apr. 6, 2021 International Search Report issued in International Patent Application No. PCT/JP2021/003079.
Mar. 5, 2024 Extended European Search Report issued in European Patent Application No. 21760739.9.

* cited by examiner

PLUNGER PUMP AND LIQUID BLOW MOLDING DEVICE

TECHNICAL FIELD

The present disclosure relates to a plunger pump that includes a tubular cylinder and a piston capable of moving in an axial direction inside the cylinder. The present disclosure also relates to a liquid blow molding apparatus that includes the plunger pump.

BACKGROUND

Synthetic resin containers, typical examples of which include polypropylene (PP) bottles and polyethylene tere-phthalate (PET) bottles, are used to contain, as content liquids, a variety of liquids, such as beverages, cosmetics, pharmaceuticals, detergents, and toiletries including shampoo. Such a container is typically manufactured by blow molding a preform that has been formed, for example, in a bottomed tubular shape using a thermoplastic synthetic resin material as mentioned above.

As a blow molding apparatus for molding a preform into a container, a liquid blow molding apparatus that uses a pressurized liquid, instead of pressurized air, as a pressurizing medium to be supplied into the preform is known.

As the liquid blow molding apparatus, a known liquid blow molding apparatus includes a nozzle unit that has a supply path for a liquid and a blow nozzle, a pressurized liquid supply unit that is connected to the supply path, and a sealing body that is arranged inside the supply path and that opens and closes the supply path. The pressurized liquid supply unit is operated in a state in which the blow nozzle is engaged to a mouth of a synthetic resin preform that has been heated in advance to a temperature at which stretch-ability may be achieved and that has been placed in a mold used for blow molding and in which the sealing body is moved to its opening position. By doing so, the pressurized liquid is supplied into the preform through the supply path and the blow nozzle, so as to mold the preform into a container having a predetermined shape corresponding to a cavity of the mold.

According to such a liquid blow molding apparatus, a content liquid, such as a beverage, that is to be ultimately contained in a container as a product may be used as a liquid supplied to the preform. Thus, the container can be molded while the content liquid is filled into the container. The liquid-filled container containing the content liquid can therefore be easily molded.

Here, the pressurized liquid supply unit included in the liquid blow molding apparatus as described above includes, for example, a liquid supply source that supplies a liquid, and a plunger pump that is connected to the liquid supply source, that draws the liquid supplied from the liquid supply source, and that delivers (pumps) the liquid to the supply path at a predetermined pressure. The plunger pump includes a tubular cylinder and a piston that can move in the axial direction inside the cylinder.

To change the type of liquid (content liquid) supplied to a preform in such a liquid blow molding apparatus, it is necessary to clean the inside of the apparatus, including the plunger pump, so as to prevent contamination (entry of impurities). As a method for cleaning the inside of such an apparatus, a cleaning method referred to as Cleaning in Place (CIP) designed for automatic cleaning using flow of a cleaning liquid or the like into the apparatus without dismantling the apparatus is known.

For example, Patent Literature 1 describes a method for cleaning a sealing portion of a piston that slides on an inner surface of a cylinder, wherein a cleaning liquid is circulated in a state in which the sealing portion has been moved to a large-diameter portion of the cylinder.

CITATION LIST

Patent Literature

PTL 1: JP 2017-501940 A

SUMMARY

Technical Problem

However, in a case in which the sealing portion of the piston is arranged in the large-diameter portion of the cylinder as described above, the piston cannot be restricted in the radial direction with respect to the cylinder, and it can easily assume an unstable position. This may lead to problems, such as damage to the sealing portion or drop-off of a sealing member like an O-ring, for example due to changes in the position or misalignment of the piston when the plunger pump is operated again after cleaning.

It would be helpful to provide a plunger pump wherein the sealing portion of the piston can be cleaned in a stable state, and a liquid blow molding apparatus.

Solution to Problem

One aspect of the present disclosure resides in a plunger pump that is capable of drawing in a liquid from an inlet flow path and delivering the liquid to an outlet flow path at a predetermined pressure, the plunger pump including:

a tubular cylinder that has an internal space communicating with the inlet flow path and the outlet flow path; and a piston that is movable along an axis of the cylinder, wherein a head of the piston is provided, on an outer peripheral surface thereof, with a sealing portion that is slidable against an inner peripheral surface of the cylinder, the cylinder includes a body tubular portion in which the head is arranged during normal use, and a cleaning tubular portion in which the head is arranged during cleaning, an inner peripheral surface of the cleaning tubular portion has an inner diameter equal to an inner diameter of an inner peripheral surface of the body tubular portion, the cleaning tubular portion is provided, on the inner peripheral surface thereof, with at least one cleaning liquid circulation groove that is configured by a through hole or a recess, and the at least one cleaning liquid circulation groove extends obliquely with respect to the axis.

In a preferred embodiment of the present plunger pump configured as above, the at least one cleaning liquid circulation groove is configured by a through hole, and a discharge flow path for discharging a cleaning liquid is provided on an outer side in a radial direction of the at least one cleaning liquid circulation groove.

In another preferred embodiment of the present plunger pump configured as above, the at least one cleaning liquid circulation groove includes a plurality of cleaning liquid circulation grooves arranged at intervals in a circumferential direction on the inner peripheral surface of the cleaning tubular portion.

In still another preferred embodiment of the present plunger pump configured as above, the plurality of cleaning liquid circulation grooves as a whole extends around an entire circumference of the inner peripheral surface of the cleaning tubular portion.

In still another preferred embodiment of the present plunger pump configured as above, the plurality of cleaning liquid circulation grooves is arranged so that any two cleaning liquid circulation grooves adjacent to each other in the circumferential direction partially overlap each other in an axial direction.

Another aspect of the present disclosure resides in a liquid blow molding apparatus that supplies a pressurized liquid into a synthetic resin preform, to thereby blow mold the preform into a container with a predetermined shape, the liquid blow molding apparatus including:

the plunger pump according to any one of the above;
a liquid supply source that is connected to the plunger pump via the inlet flow path; and
a nozzle unit that is connected to the plunger pump via the outlet flow path and that supplies a liquid to the preform arranged in a mold.

Advantageous Effect

According to the present disclosure, a plunger pump wherein the sealing portion of the piston can be cleaned in a stable state, and a liquid blow molding apparatus can be provided.

DETAILED DESCRIPTION

Hereinafter, the present disclosure will be described by illustration in more detail with reference to the drawings.

Figure 1:
FIG. 1 is a sectional view illustrating a plunger pump according to an embodiment of the present disclosure.

FIG. 1 illustrates a plunger pump 10 according to an embodiment of the present disclosure. The plunger pump 10 includes a cylinder 20 and a piston 40. The plunger pump 10 is connected to a piping member 50 that constitutes an inlet flow path R1 and an outlet flow path R2. The plunger pump 10 is configured to draw in a liquid from the inlet flow path R1 and deliver the liquid toward the outlet flow path R2 at a predetermined pressure.

In this example, the cylinder 20 is cylindrical, and an opening 21 is provided at one end (in this example, at the upper end) in an axial direction (direction along an axis O) of the cylinder 20. The cylinder 20 has an internal space S that communicates with the inlet flow path R1 and the outlet flow path R2 via the opening 21. Additionally, although in this example one opening 21 serves as both an inlet port for drawing in a liquid from the inlet flow path R1 and an outlet port for delivering the liquid to the outlet flow path R2, the present disclosure is not limited to this. An intake port and an outlet port may be provided separately in the cylinder 20.

Further, the cylinder 20 is not limited to cylindrical, and it may also have a tubular shape with a cross-section other than circular.

The cylinder 20 includes a body tubular portion 22 in which a head 41 of the piston 40 is arranged during normal use of the plunger pump 10 (when it is not cleaned), and a cleaning tubular portion 23 in which the head 41 is arranged when the plunger pump 10 is cleaned.

The body tubular portion 22 and the cleaning tubular portion 23 have inner diameters equal to each other, and they are coaxially arranged so that respective inner peripheral surfaces 22a, 23a are continuous with each other. That is, the inner peripheral surface 22a of the body tubular portion 22 and the inner peripheral surface 23a of the cleaning tubular portion 23 are smoothly continuous without a step. Accordingly, the head 41 of the piston 40 can move smoothly between the body tubular portion 22 and the cleaning tubular portion 23. Additionally, if the inner peripheral surface 22a of the body tubular portion 22 and the inner peripheral surface 23a of the cleaning tubular portion 23 are smoothly continuous without a step, the inner diameter of the body tubular portion 22 may be different from that of the cleaning tubular portion 23 to the extent that rattling can be controlled.

The cleaning tubular portion 23 in this example is located under (at a lower side in the vertical direction of) the body tubular portion 22. The inner peripheral surface 23a of the cleaning tubular portion 23 is provided with cleaning liquid circulation grooves 24 that extend obliquely with respect to the axis O. The cleaning liquid circulation grooves 24 in this example are configured by through holes that pass through the cleaning tubular portion 23 in the radial direction. The cleaning liquid circulation grooves 24 may also be configured by recesses that do not pass through the cleaning tubular portion 23. In that case, preferably, a flow path or the like for discharging the cleaning liquid is separately provided below the cleaning liquid circulation grooves 24.

Each cleaning liquid circulation groove 24 extends obliquely with respect to the axis O. That is, the cleaning liquid circulation groove 24 extends spirally around the axis O. The cleaning liquid circulation groove 24 in this example is configured so as to have a substantially parallelogram shape when viewed from the axis O. The cleaning liquid circulation groove 24 has an upper side 24a and a lower side 24b that are perpendicular to the axis O, and a right side 24c and a left side 24d that extend obliquely with respect to the axis O. Additionally, the shape of the cleaning liquid circulation groove 24, which extends obliquely with respect to the axis O, may be changed as appropriate. The cleaning liquid circulation groove 24 is not limited to a shape that extends linearly along the direction of its extension as in this example, and it can have a curved portion, a bent portion, or the like. Further, although the cleaning liquid circulation groove 24 in this example has a groove width perpendicular to the axis O that is constant over the whole cleaning liquid circulation groove 24, the groove width may vary in part. Moreover, although in this example a plurality of cleaning liquid circulation grooves 24 is included, only a single cleaning liquid circulation groove 24 may be provided on the inner peripheral surface 23a of the cleaning tubular portion 23. In that case, the single cleaning liquid circulation groove 24 preferably extends spirally around the entire circumference of the inner peripheral surface 23a of the cleaning tubular portion 23.

In this example, a plurality of cleaning liquid circulation grooves 24 is formed at intervals in the circumferential direction on the inner peripheral surface 23a of the cleaning tubular portion 23. The plurality of cleaning liquid circulation grooves 24 is arranged at regular intervals in the circumferential direction around the entire circumference of the inner peripheral surface 23a of the cleaning tubular portion 23. Additionally, although in this example each of the plurality of cleaning liquid circulation grooves 24 has the same shape, the present disclosure is not limited to this. Cleaning liquid circulation grooves 24 with different shapes may be included.

A support portion 25 is formed between two cleaning liquid circulation grooves 24 that are adjacent to each other in the circumferential direction on the inner peripheral surface 23a of the cleaning tubular portion 23. The support portions 25 are inclined with respect to the axis O, as is the case with the cleaning liquid circulation grooves 24. In this example, a plurality of support portions 25 is evenly arranged in the circumferential direction of cleaning tubular portion 23.

The plurality of cleaning liquid circulation grooves 24 as a whole extends around the entire circumference of the inner peripheral surface 23a of the cleaning tubular portion 23. That is, different cleaning liquid circulation grooves 24 are present at different positions in the axial direction, around the entire circumference of the inner peripheral surface 23a of the cleaning tubular portion 23. With such a configuration, when the piston 40 is moved in the axial direction (moved upward and downward) inside the cleaning tubular portion 23, the entire circumference of a sealing portion 43 of the piston 40 can be cleaned.

In this example, the plurality of cleaning liquid circulation grooves 24 is arranged so that any two cleaning liquid circulation grooves 24 adjacent to each other in the circumferential direction partially overlap each other in the axial direction. That is, for example, any two cleaning liquid circulation grooves 24 adjacent to each other in the circumferential direction are arranged so that an upper portion of one cleaning liquid circulation groove 24 and a lower portion of the other cleaning liquid circulation groove 24 overlap each other in the axial direction. With such a configuration, when the head 41 of the piston 40 is moved in the axial direction (upward and downward) inside the cleaning tubular portion 23, the entire circumference of the sealing portion 43 of the piston 40 can be cleaned more effectively.

The head 41 of the piston 40 is configured to be always restricted by the support portions 25 around the entire cleaning tubular portion 23 in the axial direction. That is, at any position in the axial direction of the cleaning tubular portion 23, there is appropriately a support portion 25 that supports the head 41 of the piston 40 from the outer side in the radial direction. Accordingly, even when the head 41 of the piston 40 is moved in the axial direction inside the cleaning tubular portion 23, the position and location of the piston 40 can be maintained in a stable state.

The cleaning liquid circulation grooves 24 communicate with a cleaning liquid discharge port 27 via a discharge flow path 26 provided on the outer side in the radial direction of the cleaning liquid circulation grooves 24. The discharge flow path 26 may be an annular space that extends around the entire circumference of the cleaning tubular portion 23, or it may be a space that is present only in part in the circumferential direction. The cleaning liquid discharge port 27 in this example is located at a lower end of the discharge flow path 26, and it opens to the outer side in the radial direction. The cleaning liquid discharge port 27 may be an annular opening that extends around the entire circumference of the cleaning tubular portion 23, or it may be an opening that is present only in part in the circumferential direction.

Additionally, the cylinder 20 may be formed by combining a plurality of members as in this example, or it may be a single member molded entirely in one piece.

The cylinder 20 in this example includes an upper tubular member 31 that is connected to the piping member 50, and a lower tubular member 33 that is connected to a lower end of the upper tubular member 31 via a connecting member 32. An upper outer tubular member 34 and a lower outer tubular member 35 are further provided on the outer side in the radial direction (closer to an outer periphery) of the lower tubular member 33, and an annular support tubular member 36 is provided under the lower tubular member 33. In this example, the body tubular portion 22 is configured by the upper tubular member 31 and the connecting member 32, and the cleaning tubular portion 23 is configured by the lower tubular member 33. The discharge flow path 26 is formed between the lower tubular member 33 and the upper outer tubular member 34, and the cleaning liquid discharge port 27 is formed between the upper outer tubular member 34 and the lower outer tubular member 35. The inner peripheral surface of the support tubular member 36 is configured to slide against the outer peripheral surface of a piston rod 42.

Here, the piping member 50 can be cylindrical, for example. In the piping member 50 in this example, a hole 51 is formed so as to pass through its side wall. The cylinder 20 is connected so that the opening 21 of the cylinder 20 is arranged in the hole 51 of the piping member 50.

The piping member 50 is provided with an annular inclined surface 52 that surrounds the hole 51, and a fitting recess 53 is provided adjacent to the inclined surface 52. In this example, an upper end of the upper tubular member 31 (body tubular portion 22) of the cylinder 20 is fitted into the annular fitting recess 53 provided in the piping member 50.

A sealing member 37 is arranged at the joint between the cylinder 20 and the piping member 50. In this example, the sealing member 37 configured by a ring-shaped packing or the like is fitted into an attachment groove 22b formed at an upper end of the inner peripheral surface 22a, so that the sealing member 37 is exposed to the internal space S. The sealing member 37 is sandwiched between the upper tubular member 31 and the piping member 50 in the axial direction. By thus arranging the ring-shaped sealing member 37 at a position that is exposed to the internal space S, it can be further ensured that entry of liquid into the joint between piping member 50 and the cylinder 20 (joint between the piping member 50 and the upper tubular member 31) is prevented.

The piston 40 is arranged so as to be movable in the axial direction in the internal space S of the cylinder 20. The piston 40 includes the head 41 and the piston rod 42. The head 41 is columnar, with an outer peripheral surface 41a being shaped in accordance with the shape of the inner peripheral surface of the cylinder 20. The piston rod 42 is columnar, with a diameter smaller than the head 41. In this example, the head 41 and the piston rod 42 are cylindrical. A driving device (which is not illustrated) is provided at a base end of the piston rod 42, so as to move the piston 40 in the axial direction.

The sealing portion 43 is provided on the outer peripheral surface 41a of the head 41. The sealing portion 43 slides against the inner peripheral surfaces 22a, 23a of the cylinder 20. The sealing portion 43 in this example is configured by an annular (ring-shaped) O-ring 43a provided on the outer peripheral surface 41*a* of the head 41, and a pair of annular (ring-shaped) wear rings 43*b*, 43*c* located above and below the O-ring 43*a*. The O-ring 43*a* and the wear rings 43*b*, 43*c* are respectively fitted into annular grooves 41*b*, 41*c*, and 41*d* formed on the outer peripheral surface 41*a* of the head 41.

The configuration of the sealing portion 43 provided on the outer peripheral surface 41*a* of the head 41 is not limited to the illustrated example. The material, number, arrangement, or the like of the sealing portion 43 can be determined as appropriate, if it can slide against the inner peripheral surfaces 22*a*, 23*a* of the cylinder 20 and ensure airtightness between the piston 40 and the cylinder 20.

Figure 2:
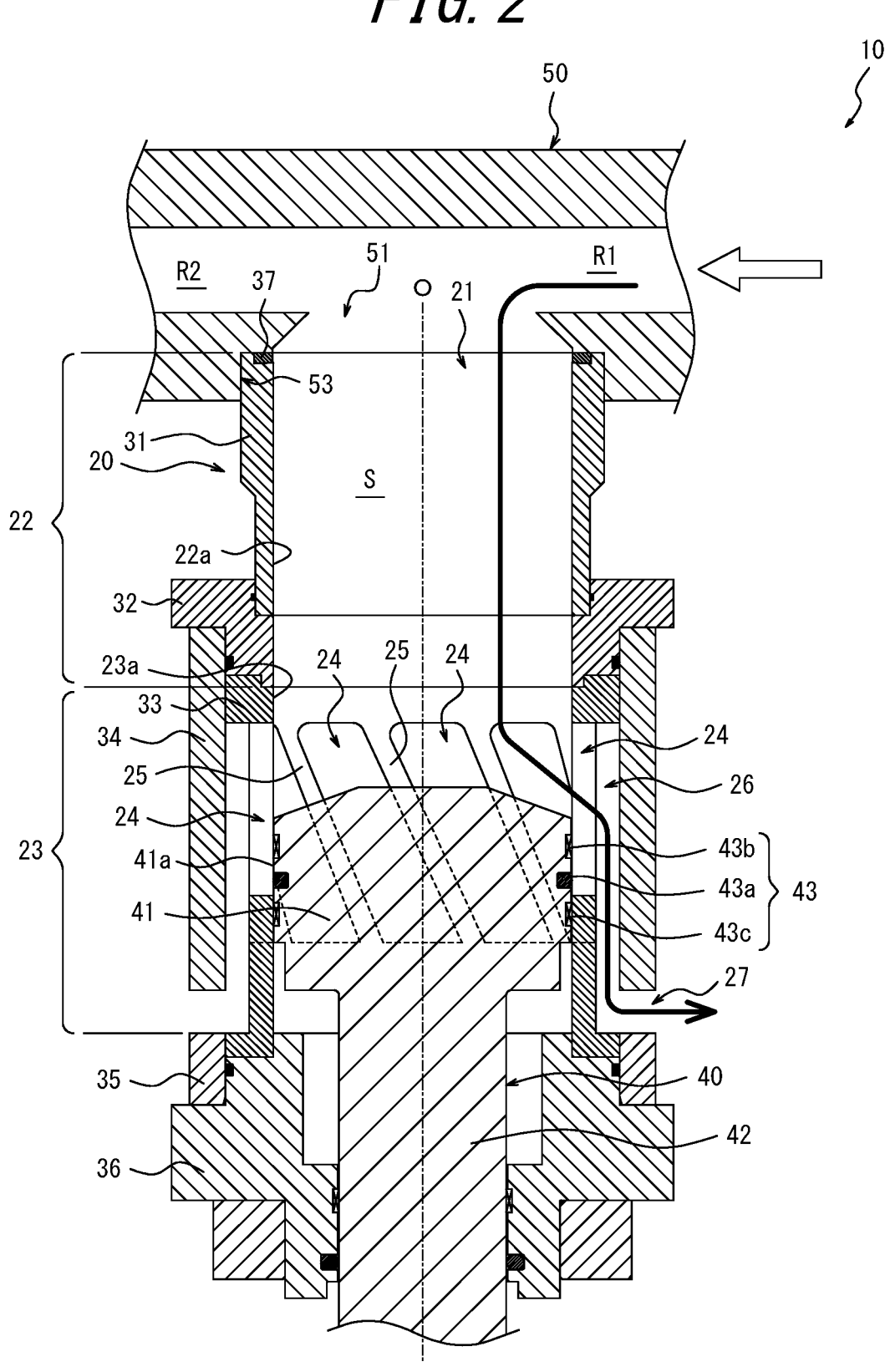
FIG. 2 is a sectional view illustrating a state in which a head of a piston in the plunger pump of FIG. 1 has been moved to a cleaning position.

When the aforementioned plunger pump 10 described above is to be cleaned (CIP cleaned), the head 41 of the piston 40 is arranged in the cleaning tubular portion 23 of the cylinder 20, and a cleaning liquid is circulated into the cleaning liquid circulation grooves 24, as illustrated by the arrow in FIG. 2. By arranging the head 41 in the cleaning tubular portion 23 of the cylinder 20, the sealing portion 43 is exposed to the cleaning liquid circulation grooves 24, so that the cleaning liquid flowing in the cleaning liquid circulation grooves 24 can be used to clean the sealing portion 43 of the piston 40. At this time, the entire sealing portion 43 can be more effectively cleaned, by circulating the cleaning liquid into the cleaning liquid circulation grooves 24 while the piston 40 is reciprocated in the axial direction (moved upward and downward).

The support portions 25 support the outer peripheral surface 41*a* of the head 41 of the piston 40 and the sealing portion 43 that are located in the cleaning tubular portion 23 from the outer side in the radial direction. That is, the head 41 of the piston 40 located in the cleaning tubular portion 23 is restricted in the radial direction by the support portions 25 on the inner peripheral surface 23*a* of the cleaning tubular portion 23. The piston 40 is therefore maintained in a stable state during cleaning. As a result, inclination of the position, misalignment, or the like of the piston 40 during cleaning can be prevented. In particular, because in this example a plurality of support portions 25 arranged at intervals in the circumferential direction of the cleaning tubular portion 23 supports the outer peripheral surface 41*a* of the head 41 of the piston 40 in the circumferential direction in a well-balanced manner, the position and location of the head 41 of the piston 40 located in the cleaning tubular portion 23 are more easily stabilized.

As described above, the plunger pump 10 according to the present embodiment is a plunger pump 10 that is capable of drawing in a liquid from an inlet flow path R1 and delivering the liquid to an outlet flow path R2 at a predetermined pressure, the plunger pump 10 including a tubular cylinder 20 that has an internal space S communicating with the inlet flow path R1 and the outlet flow path R2, and a piston 40 that is movable along an axis O of the cylinder 20, wherein a head 41 of the piston 40 is provided, on an outer peripheral surface 41*a* thereof, with a sealing portion 43 that is slidable against an inner peripheral surface 22*a* of the cylinder 20, the cylinder 20 includes a body tubular portion 22 in which the head 41 is arranged during normal use, and a cleaning tubular portion 23 in which the head 41 is arranged during cleaning, an inner peripheral surface 23*a* of the cleaning tubular portion 23 has an inner diameter equal to an inner diameter of the inner peripheral surface 22*a* of the body tubular portion 22, the cleaning tubular portion 23 is provided, on the inner peripheral surface 23*a* thereof, with at least one cleaning liquid circulation groove 24 that is configured by a through hole (or a recess), and the at least one cleaning liquid circulation groove 24 extends obliquely with respect to the axis O. With such a configuration, when the plunger pump 10 is cleaned (CIP cleaned), the sealing portion 43 of the piston 40 can be appropriately cleaned in a state in which the head 41 of the piston 40 is restricted in a radial direction with respect to the cylinder 20.

Thus, according to the plunger pump 10 of the present embodiment, the sealing portion 43 of the piston 40 can be cleaned in a stable state. Accordingly, when it is operated again after cleaning, damage to the sealing portion 43, drop-off of a sealing member (the O-ring 43*a* and the wear rings 43*b*, 43*c*), or the like caused by changes in the position or misalignment of the piston 40, or the like can be prevented.

In the plunger pump 10 according to the present embodiment, the at least one cleaning liquid circulation groove 24 is configured by a through hole, and a discharge flow path 26 for discharging a cleaning liquid is provided on an outer side in a radial direction of the at least one cleaning liquid circulation groove 24. With such a configuration, the cleaning liquid that has circulated in the at least one cleaning liquid circulation groove 24 can be smoothly discharged. This in turn prevents the cleaning liquid from flowing back toward the internal space S and reducing the cleaning effect, for example.

In the plunger pump 10 according to the present embodiment, the at least one cleaning liquid circulation groove 24 includes a plurality of cleaning liquid circulation grooves 24 arranged at intervals in a circumferential direction on the inner peripheral surface 23*a* of the cleaning tubular portion 23. With such a configuration, the sealing portion 43 of the piston 40 can be cleaned more efficiently compared with a case in which there is only one cleaning liquid circulation groove 24.

In the plunger pump 10 according to the present embodiment, the plurality of cleaning liquid circulation grooves 24 as a whole extends around an entire circumference of the inner peripheral surface 23*a* of the cleaning tubular portion 23. With such a configuration, the sealing portion 43 of the piston 40 can be efficiently cleaned around its entire circumference.

In the plunger pump 10 according to the present embodiment, the plurality of cleaning liquid circulation grooves 24 is arranged so that any two cleaning liquid circulation grooves 24 adjacent to each other in the circumferential direction partially overlap each other in an axial direction. With such a configuration, the sealing portion 43 of the piston 40 can be more efficiently cleaned around its entire circumference.

Figure 3:
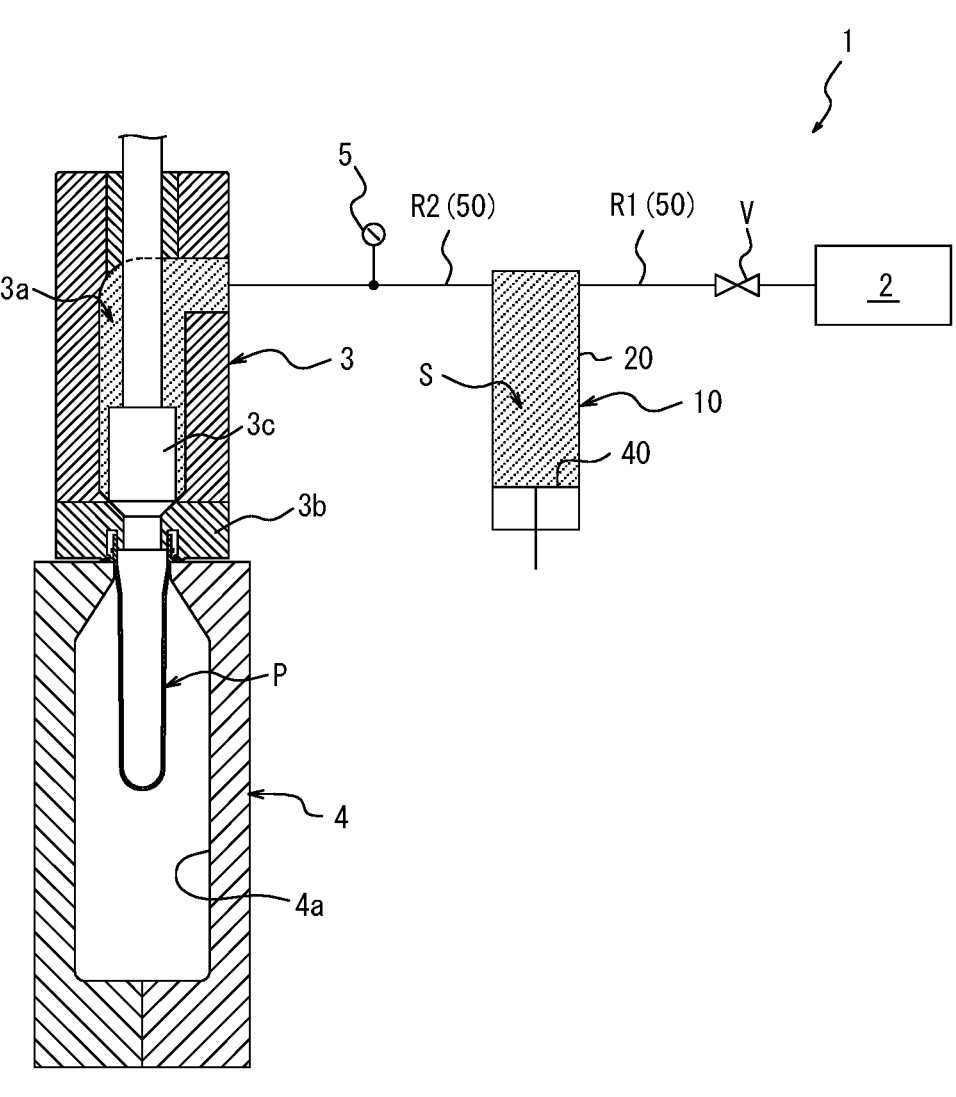
FIG. 3 illustrates an overview of a liquid blow molding apparatus according to an embodiment of the present disclosure.

Now, FIG. 3 is a schematic view illustrating a liquid blow molding apparatus 1 that includes a plunger pump 10. The liquid blow molding apparatus 1 is capable of supplying a pressurized liquid into a synthetic resin preform P, to thereby blow mold the preform P into a container with a predetermined shape.

The liquid blow molding apparatus 1 includes, for example, the plunger pump 10, a liquid supply source 2 that is connected to the plunger pump 10 via the inlet flow path R1, and a nozzle unit 3 (injection apparatus) that is connected to the plunger pump 10 via the outlet flow path R2 and that supplies a liquid to the preform P arranged in a mold 4.

The liquid supply source 2 can be, for example, a supply tank that contains a liquid. The supply tank may be configured to contain the liquid and to heat or cool the liquid to a predetermined temperature and hold it at the temperature. An opening and closing valve V is provided in the inlet flow path R1 (piping member 50) between the plunger pump 10 and the liquid supply source 2. The opening and closing valve V can be used to open and close the inlet flow path R1. Additionally, a pressure gauge 5 may be provided in the outlet flow path R2.

The nozzle unit 3 is arranged above the mold 4. The nozzle unit 3 can be driven by a driving device that is not illustrated, so as to move in the vertical direction closer to and away from the mold 4. The nozzle unit 3 includes a supply path 3a for a liquid, a blow nozzle 3b provided at an end of the supply path 3a, and a sealing body 3c provided inside the supply path 3a. The supply path 3a is connected to the outlet flow path R2. The sealing body 3c is configured to open and close the supply path 3a. The mold 4 has a cavity 4a with a shape, such as a bottle shape, that corresponds to the final shape of the container.

When a liquid-filled container is to be molded using the liquid blow molding apparatus 1, the head 41 of the piston 40 of the plunger pump 10 is arranged in the body tubular portion 22 of the cylinder 20, so that it moves in the axial direction within the range of the body tubular portion 22.

The plunger pump 10 can supply a liquid that has been pressurized to a predetermined pressure to the blow nozzle 3b via the outlet flow path R2 and the supply path 3a, by operating (in this example, raising) the piston 40 in a pressurizing direction in a state in which the sealing body 3c is in the opening position so as to open the supply path 3a and in which the opening and closing valve V is closed. The plunger pump 10 can also draw the liquid contained in the liquid supply source 2 into the internal space S of the cylinder 20 of the plunger pump 10, by operating (in this example, lowering) the piston 40 in a drawing direction in a state in which the sealing body 3c is in the closing position so as to close the supply path 3a and in which the opening and closing valve V is opened.

As the preform P, for example, a preform formed in a shape including a cylindrical mouth serving as an opening end, and a bottomed cylindrical body continuous with the mouth may be used. A thermoplastic resin material, such as polypropylene (PP) or polyethylene terephthalate (PET), may be injection molded to form the preform P. The preform P is not limited to the above example, and various shapes and materials can be used. For example, as the preform P, a preform with a laminated structure including a plurality of integrally laminated layers can be used.

According to the liquid blow molding apparatus 1, the blow nozzle 3b is engaged with the mouth of the synthetic resin preform P that has been heated in advance to a temperature at which stretchability can be achieved and that has been placed in the mold 4, and the plunger pump 10 is operated so as to supply a pressurized liquid into the preform P. By doing so, the preform P can be molded into a container with a predetermined shape corresponding to the cavity 4a of the mold 4, while the liquid can be contained inside the container. According to such a liquid blow molding apparatus 1, by using a content liquid, such as a beverage, that is to be ultimately contained in the container as a product, as the liquid supplied to the preform P, molding of the container and filling of the content liquid into the container can be performed simultaneously, so that the liquid-filled container containing the content liquid can be easily molded. Accordingly, the step of filling the content liquid into the molded container may be omitted, and the production process and the configuration of production line (apparatus) may be simplified. Additionally, examples of the liquid supplied to the preform P as a pressurized medium in blow molding may include, but is not limited to, various liquids, such as beverages, cosmetics, pharmaceuticals, detergents, toiletries like shampoo.

In the liquid blow molding apparatus 1, for example, in a case in which the type of liquid (content liquid) to be supplied to the preform P is changed, CIP may be performed so as to clean the liquid blow molding apparatus 1, by circulating a cleaning liquid or the like within the apparatus without dismantling it. In particular, in the plunger pump 10, due to the head 41 of the piston 40 that is arranged in the cleaning tubular portion 23 of the cylinder 20 (moved in the axial direction within the range of the cleaning tubular portion 23) as described above, the sealing portion 43 of the piston 40 can be cleaned in a stable state.

Needless to say, the present disclosure is not limited to the above embodiment, and various modifications can be made without departing from the gist of the present disclosure.

For example, although in the above embodiment the plunger pump 10 is connected below the piping member 50, so that the axis O of the cylinder 20 is orthogonal to the piping member 50 extending in the horizontal direction, the extension directions and connection method of the piping member 50 and the plunger pump 10 are not limited to the illustrated example and can be changed as appropriate.

Further, although in the above embodiment the cleaning liquid that has passed through the inlet flow path R1 of the piping member 50 is circulated in the cleaning liquid circulation grooves 24 through the opening 21 of the cylinder 20 and the internal space S, the flow path of the cleaning liquid can be changed as appropriate. For example, instead of introducing the cleaning liquid through the opening 21 provided at the upper end of the cylinder 20, a cleaning liquid introduction port that is different from the opening 21 may be provided in the cylinder 20. Moreover, although in this example the cleaning liquid that has passed through the cleaning liquid circulation grooves 24 passes through the discharge flow path 26 located on the outer side in the radial direction of the cleaning liquid circulation grooves 24 before being discharged from the cleaning liquid discharge port 27, the present disclosure is not limited to this. A cleaning liquid discharge flow path or the like may be provided at another position.

The liquid blow molding apparatus 1 is not limited to the example illustrated in FIG. 3. For example, the nozzle unit 3 may be provided with a stretching rod. The plunger pump according to the present disclosure is also applicable to a (general) filling machine for filling a content liquid into a pre-molded container, without being limited to a liquid blow molding apparatus.

REFERENCE SIGNS LIST

1 Liquid blow molding apparatus
2 Liquid supply source
3 Nozzle unit
3a Supply path
3b Nozzle
3c Sealing body
4 Mold
4a Cavity
5 Pressure gauge
10 Plunger pump
20 Cylinder
21 Opening
22 Body tubular portion
22a Inner peripheral surface
22b Attachment groove 23 Cleaning tubular portion
23*a* Inner peripheral surface
24 Cleaning liquid circulation groove
24*a* Upper side
24*b* Lower side
24*c* Right side
24*d* Left side
25 Support portion (restriction portion)
26 Discharge flow path
27 Cleaning liquid discharge port
31 Upper tubular member
32 Connecting member
33 Lower tubular member
34 Upper outer tubular member
35 Lower outer tubular member
36 Support tubular member
37 Sealing member
40 Piston
41 Head
41*a* Outer peripheral surface
41*b*, 41*c*, 41*d* Annular groove
42 Piston rod
43 Sealing portion
43*a* O-ring
43*b*, 43*c* Wear ring
50 Piping member
51 Hole
52 Inclined surface
53 Fitting recess
P Preform
R1 Inlet flow path
R2 Outlet flow path
O Axis
S Internal space
V Opening and closing valve

The invention claimed is:

1. A plunger pump that is configured to draw in a liquid from an inlet flow path and deliver the liquid to an outlet flow path at a predetermined pressure, the plunger pump comprising:
a tubular cylinder that has an internal space communicating with the inlet flow path and the outlet flow path; and
a piston that is movable along an axis of the cylinder, wherein
a head of the piston includes, on an outer peripheral surface thereof, a sealing portion that is slidable against an inner peripheral surface of the cylinder,
the cylinder includes a body tubular portion in which the head is arranged during normal use, and a cleaning tubular portion in which the head is arranged during cleaning,
an inner peripheral surface of the cleaning tubular portion has an inner diameter equal to an inner diameter of an inner peripheral surface of the body tubular portion,
the cleaning tubular portion includes, on the inner peripheral surface thereof, at least one cleaning liquid circulation groove that is a through hole that passes through the cleaning tubular portion in the radial direction, and
the at least one cleaning liquid circulation groove extends spirally around the axis.

2. The plunger pump according to claim 1, wherein
the at least one cleaning liquid circulation groove is a through hole, and
a discharge flow path for discharging a cleaning liquid is on an outer side in a radial direction of the at least one cleaning liquid circulation groove.

3. The plunger pump according to claim 2, wherein
the at least one cleaning liquid circulation groove comprises a plurality of cleaning liquid circulation grooves arranged at intervals in a circumferential direction on the inner peripheral surface of the cleaning tubular portion.

4. The plunger pump according to claim 3, wherein
the plurality of cleaning liquid circulation grooves as a whole extend around an entire circumference of the inner peripheral surface of the cleaning tubular portion.

5. The plunger pump according to claim 4, wherein
the plurality of cleaning liquid circulation grooves are arranged so that any two cleaning liquid circulation grooves adjacent to each other in the circumferential direction partially overlap each other in an axial direction.

6. The plunger pump according to claim 3, wherein
the plurality of cleaning liquid circulation grooves are arranged so that any two cleaning liquid circulation grooves adjacent to each other in the circumferential direction partially overlap each other in an axial direction.

7. The plunger pump according to claim 1, wherein
the at least one cleaning liquid circulation groove comprises a plurality of cleaning liquid circulation grooves arranged at intervals in a circumferential direction on the inner peripheral surface of the cleaning tubular portion.

8. The plunger pump according to claim 7, wherein
the plurality of cleaning liquid circulation grooves as a whole extend around an entire circumference of the inner peripheral surface of the cleaning tubular portion.

9. The plunger pump according to claim 8, wherein
the plurality of cleaning liquid circulation grooves are arranged so that any two cleaning liquid circulation grooves adjacent to each other in the circumferential direction partially overlap each other in an axial direction.

10. The plunger pump according to claim 7, wherein
the plurality of cleaning liquid circulation grooves are arranged so that any two cleaning liquid circulation grooves adjacent to each other in the circumferential direction partially overlap each other in an axial direction.

11. A liquid blow molding apparatus that supplies a pressurized liquid into a synthetic resin preform, to thereby blow mold the preform into a container with a predetermined shape, the liquid blow molding apparatus comprising:
the plunger pump according to claim 1;
a liquid supply source that is connected to the plunger pump via the inlet flow path; and
a nozzle unit that is connected to the plunger pump via the outlet flow path and that supplies a liquid to the preform arranged in a mold.

12. A liquid blow molding apparatus that supplies a pressurized liquid into a synthetic resin preform, to thereby blow mold the preform into a container with a predetermined shape, the liquid blow molding apparatus comprising:
the plunger pump according to claim 2;
a liquid supply source that is connected to the plunger pump via the inlet flow path; and
a nozzle unit that is connected to the plunger pump via the outlet flow path and that supplies a liquid to the preform arranged in a mold.

13. A liquid blow molding apparatus that supplies a pressurized liquid into a synthetic resin preform, to thereby blow mold the preform into a container with a predetermined shape, the liquid blow molding apparatus comprising:

the plunger pump according to claim 7;

a liquid supply source that is connected to the plunger pump via the inlet flow path; and a nozzle unit that is connected to the plunger pump via the outlet flow path and that supplies a liquid to the preform arranged in a mold.

14. A liquid blow molding apparatus that supplies a pressurized liquid into a synthetic resin preform, to thereby blow mold the preform into a container with a predetermined shape, the liquid blow molding apparatus comprising:

the plunger pump according to claim 8;

a liquid supply source that is connected to the plunger pump via the inlet flow path; and a nozzle unit that is connected to the plunger pump via the outlet flow path and that supplies a liquid to the preform arranged in a mold.

15. A liquid blow molding apparatus that supplies a pressurized liquid into a synthetic resin preform, to thereby blow mold the preform into a container with a predetermined shape, the liquid blow molding apparatus comprising:

the plunger pump according to claim 10;

a liquid supply source that is connected to the plunger pump via the inlet flow path; and a nozzle unit that is connected to the plunger pump via the outlet flow path and that supplies a liquid to the preform arranged in a mold.

16. A liquid blow molding apparatus that supplies a pressurized liquid into a synthetic resin preform, to thereby blow mold the preform into a container with a predetermined shape, the liquid blow molding apparatus comprising:

the plunger pump according to claim 3;

a liquid supply source that is connected to the plunger pump via the inlet flow path; and a nozzle unit that is connected to the plunger pump via the outlet flow path and that supplies a liquid to the preform arranged in a mold.

17. A liquid blow molding apparatus that supplies a pressurized liquid into a synthetic resin preform, to thereby blow mold the preform into a container with a predetermined shape, the liquid blow molding apparatus comprising:

the plunger pump according to claim 4;

a liquid supply source that is connected to the plunger pump via the inlet flow path; and a nozzle unit that is connected to the plunger pump via the outlet flow path and that supplies a liquid to the preform arranged in a mold.

18. A liquid blow molding apparatus that supplies a pressurized liquid into a synthetic resin preform, to thereby blow mold the preform into a container with a predetermined shape, the liquid blow molding apparatus comprising:

the plunger pump according to claim 9;

a liquid supply source that is connected to the plunger pump via the inlet flow path; and a nozzle unit that is connected to the plunger pump via the outlet flow path and that supplies a liquid to the preform arranged in a mold.

19. A liquid blow molding apparatus that supplies a pressurized liquid into a synthetic resin preform, to thereby blow mold the preform into a container with a predetermined shape, the liquid blow molding apparatus comprising:

the plunger pump according to claim 6;

a liquid supply source that is connected to the plunger pump via the inlet flow path; and a nozzle unit that is connected to the plunger pump via the outlet flow path and that supplies a liquid to the preform arranged in a mold.

20. A liquid blow molding apparatus that supplies a pressurized liquid into a synthetic resin preform, to thereby blow mold the preform into a container with a predetermined shape, the liquid blow molding apparatus comprising:

the plunger pump according to claim 5;

a liquid supply source that is connected to the plunger pump via the inlet flow path; and a nozzle unit that is connected to the plunger pump via the outlet flow path and that supplies a liquid to the preform arranged in a mold.

* * * * *